United States Patent
Held et al.

(10) Patent No.: US 8,249,778 B2
(45) Date of Patent: Aug. 21, 2012

(54) METHOD FOR CONTROLLING THE STEERING FEEDBACK TORQUE

(75) Inventors: Veit Held, Bensheim (DE); Lars Hessman, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 443 days.

(21) Appl. No.: 12/395,329

(22) Filed: Feb. 27, 2009

(65) Prior Publication Data

US 2009/0222169 A1    Sep. 3, 2009

(30) Foreign Application Priority Data

Feb. 28, 2008    (EP) .................... 08003626

(51) Int. Cl.
  *B62D 5/00*    (2006.01)
(52) U.S. Cl. .................... 701/42; 180/443
(58) Field of Classification Search .............. None
  See application file for complete search history.

(56) References Cited

U.S. PATENT DOCUMENTS

| | | | |
|---|---|---|---|
| 5,198,981 A * | 3/1993 | Collier-Hallman et al. ..... | 701/42 |
| 5,347,458 A | 9/1994 | Serizawa et al. | |
| 5,709,281 A | 1/1998 | Sherwin et al. | |
| 6,079,513 A | 6/2000 | Nishizaki et al. | |
| 2003/0220727 A1 | 11/2003 | Husain et al. | |
| 2006/0129293 A1 | 6/2006 | Bernzen et al. | |
| 2007/0144824 A1 * | 6/2007 | Tamaki et al. ............... | 180/446 |

FOREIGN PATENT DOCUMENTS

| | | |
|---|---|---|
| DE | 19912169 A1 | 7/2000 |
| EP | 0858942 A1 | 8/1998 |
| EP | 1442958 A2 | 8/2004 |
| FR | 2839037 A1 | 10/2003 |
| JP | 2006-281881 | * 10/2006 |

OTHER PUBLICATIONS

European Patent Office, European Extended Search Report for Application No. 08003626.2, dated Jul. 30, 2008.

* cited by examiner

*Primary Examiner* — Michael J. Zanelli
(74) *Attorney, Agent, or Firm* — Ingrassia Fisher & Lorenz, P.C.

(57) ABSTRACT

The invention relates to a method for controlling the steering feedback torque of a power steering system within a closed loop control system, whereby the power steering system provides an actual value (TACT) of the steering feedback torque, whereby a nominal value ($T_{NOM}$) of the steering feedback torque is calculated by first processor using vehicle dynamic related measurements or estimates, whereby a difference between said actual value (TACT) of the steering feedback torque and said nominal value ($T_{NOM}$) of the steering feedback torque is used as an input for a controller providing an controller output (COUT), and whereby an input for the power steering system is provided on basis of said controller output (COUT) influencing said steering feedback torque in a way that the difference between said actual value (TACT) of the steering feedback torque and said a nominal value ($T_{NOM}$) of the steering feedback torque is eliminated.

18 Claims, 2 Drawing Sheets

METHOD FOR CONTROLLING THE STEERING FEEDBACK TORQUE

CROSS-REFERENCE TO RELATED APPLICATION

This application claims priority to European Patent Application No. 08003626.2-1523, filed Feb. 28, 2008, which is incorporated herein by reference in its entirety.

DESCRIPTION

Field of the Invention

The invention relates to a method for controlling the steering feedback torque of a power steering system within a closed loop control system.

BACKGROUND AND PRIOR ART

Generally steering torque variations experienced as disturbances can be mitigated by appropriate geometrical design of the steering mechanism and front suspension of a vehicle. This has proven to be hard to achieve in real life vehicles because of cost and packaging issues resulting in a less than ideal geometry.

The experienced amount of disturbances can also be diminished by using a high level of power support or other techniques like various types of filtering, friction and damping in the steering system that isolate the driver from variations of the required steering torque. This will unfortunately also isolate the driver from desired feedback signals in the steering system e.g. variations in self aligning torque and will have a detrimental effect on steering feedback and steering feel.

This problem is most evident in small front wheel driven cars with powerful engines and wide low-profile tires.

The prior art document EP 1 442 958 A2 shows a steering system comprising an open loop steering torque controller and an open loop steering angle controller. The open loop steering torque controller provides an output overlapping with the steering torque provided by a driver using the steering wheel. The open loop steering angle controller provides an output overlapping with the steering angle provided by a driver using the steering wheel.

SUMMARY OF THE INVENTION

The present invention provides a method for controlling the steering feedback torque of a power steering system within a closed loop control system, whereby the power steering system provides an actual value of the steering feedback torque, whereby a nominal value of the steering feedback torque is calculated by first processor using vehicle dynamic related measurements or estimates, whereby a difference between said actual value of the steering feedback torque and said nominal value of the steering feedback torque is used as an input for a controller providing a controller output, and whereby an input for the power steering system is provided on basis of said controller output influencing said steering feedback torque in a way that the difference between said actual value of the steering feedback torque and said a nominal value of the steering feedback torque is eliminated.

The present invention allows elimination and mitigation of steering torque disturbances without adding any hardware to a vehicle as long as one electronic controller in the vehicle has enough capacity without changes to steering and front suspension geometries.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The invention relates to a method for controlling the steering feedback torque of a power steering system within a closed loop control system.

Figure 1:
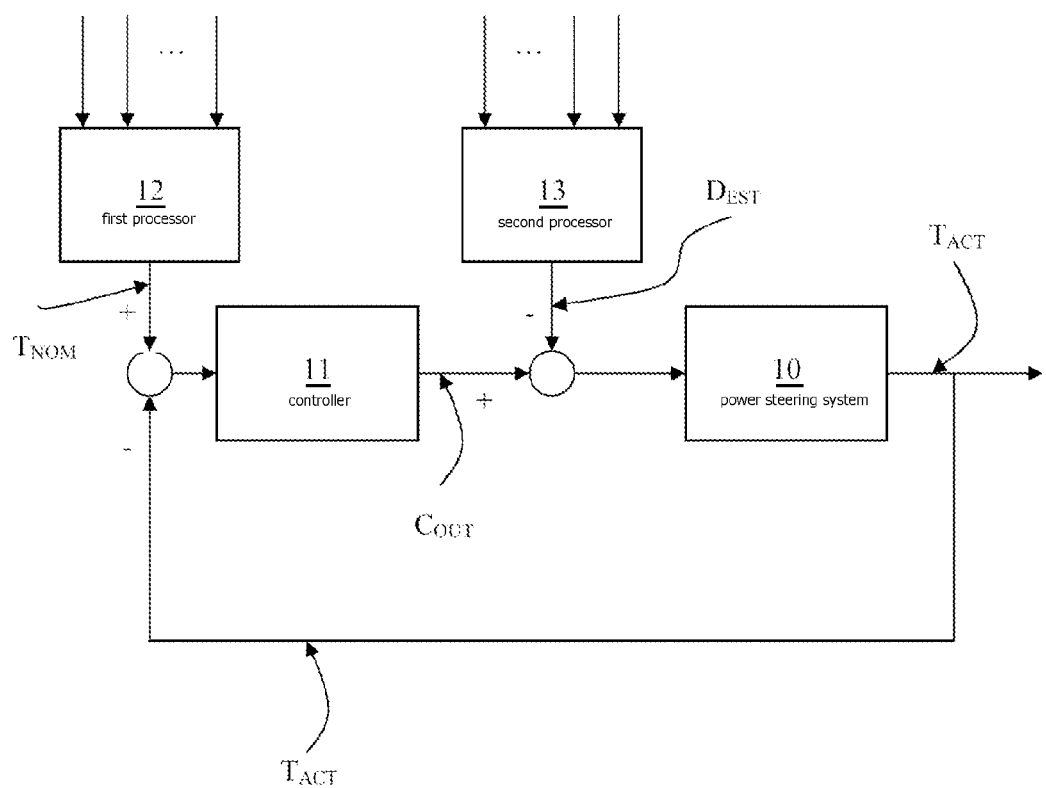
FIG. 1 shows a block diagram of a closed loop control system comprising a power steering system and a controller for illustrating the method according to the present invention.

FIG. 1 shows a block diagram of a closed loop control system comprising a power steering system 10. The power steering system 10 provides as output an actual value TACT of the steering feedback torque.

The closed loop control system further comprises a controller 11. An input of the controller 11 is determined from said actual value TACT of the steering feedback torque provided by the power steering system 10 and from a nominal value $T_{NOM}$ of the steering feedback torque. Said nominal value $T_{NOM}$ of the steering feedback torque is calculated by first processor 12 using vehicle dynamic related measurements or estimates as inputs.

The first processor 12 are calculating said nominal value $T_{NOM}$ of the steering feedback torque using measurements or estimates of the steering angle and/or of the vehicle speed and/or of the vehicle side acceleration and/or of the vehicle yaw rate and/or of the powertrain torque and/or of time derivates of at least one of these vehicle dynamic related measurements or estimates. The measurements or estimates of the steering angle are provided by said power steering system 10. The measurements or estimates of vehicle speed and/or of the vehicle side acceleration and/or of the vehicle yaw rate can be provided by a stability control system of the vehicle. Such a stability control system of the vehicle is often called ESP system or ESC system. The powertrain torque can be provided by the powertrain control system.

The nominal value $T_{NOM}$ can be calculated using a physically based model or a fully experimental model using whatever vehicle dynamics data is available.

Figure 2:
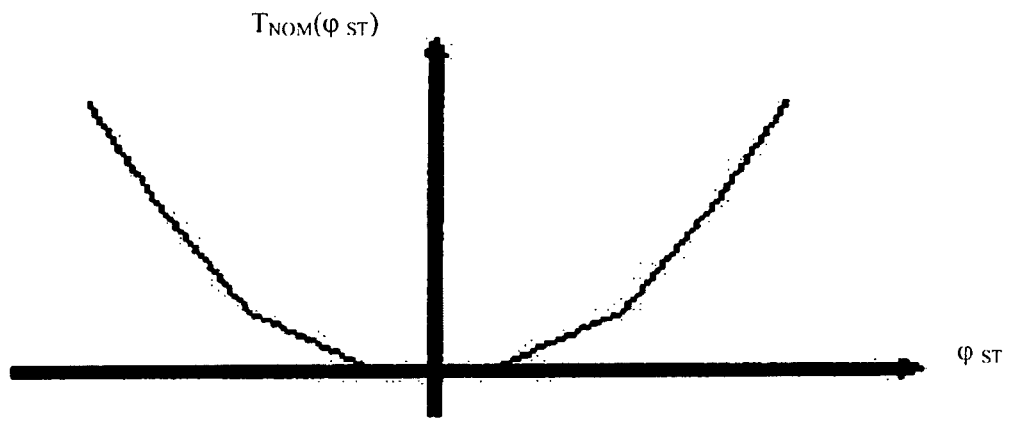
FIG. 2 shows a characteristic curve for the calculation of the nominal value $T_{NOM}$ as a function of steering angle $\Phi_{ST}$.
Figure 3:
FIG. 3 shows a characteristic curve for the calculation of a factor g as a function of vehicle speed v used for the calculation of the nominal value $T_{NOM}$.

The nominal value $T_{NOM}$ of the steering feedback torque can be calculated using different formulas and/or characteristic curves. E.g., the nominal value $T_{NOM}$ of the steering feedback torque can be calculated using the characteristic curve $T_{NOM}=f(\Phi_{ST})$ shown in FIG. 2, whereby $\Phi_{ST}$ is the steering angle and whereby f is a symmetric, tuneable function. Further on, the nominal value $T_{NOM}$ of the steering feedback torque can be calculated by $T_{NOM}=v*g(v)$, whereby f($\Phi_{ST}$) is the characteristic curve of FIG. 2 and whereby g(v) is the characteristic curve of FIG. 3 depending on vehicle speed v.

Alternatively, the nominal value $T_{NOM}$ of the steering feedback torque can be calculated using the formula:

$$T_{NOM} = \sum_{n=1}^{5} (C_n^0 u_n + C_n^1 \dot{u}_n)$$

whereby u1 is vehicle longitudinal speed, u2 is vehicle lateral acceleration, u3 is steering wheel angle, u4 is vehicle yaw rate, u5 is (engine) driving torque at the driving wheels, whereby C0n and C1n are constants, and whereby are the first time derivates of the variables u.

The nominal value $T_{NOM}$ of the steering feedback torque is calculated by said first processor 12 in real time.

According to FIG. 1, the difference between the actual value TACT of the steering feedback torque provided by the power steering system 10 and the nominal value $T_{NOM}$ of the steering feedback torque provided by said first processor 12 is used as an input for the controller 11, whereby the controller 11 provides a controller output COUT.

On basis of the controller output COUT an input for the power steering system 10 is provided influencing said steering feedback torque in a way that the difference between said actual value TACT of the steering feedback torque and said a nominal value $T_{NOM}$ of the steering feedback torque is minimized.

Preferably, said input for the power steering system 10 influencing said steering feedback torque is provided on basis of said controller output COUT and on basis of an output DEST provided by second processor 13 using vehicle dynamic related measurements or estimates. Said output DEST provided by said second processor 13 influences said steering feedback torque in a way that predictable disturbances of the steering feedback torque are compensated.

Said output DEST provided by second processor 13 is calculated using measurements or estimates of the steering angle and/or of the vehicle speed and/or of the vehicle side acceleration and/or of the vehicle yaw rate and/or of the powertrain torque and/or of time derivates of at least one of these vehicle dynamic related measurements or estimates. The measurements or estimates of the steering angle are provided by said power steering system 10.

The measurements or estimates of vehicle speed and/or of the vehicle side acceleration and/or of the vehicle yaw rate and/or of the powertrain torque can be provided by a stability control system (ESP system or ESC system) of the vehicle.

The output DEST can be calculated using the formula $$D_{EST} = \sum_{n=1}^{5} (K_n^0 u_n + K_n^1 \dot{u}_n)$$

whereby u1 is vehicle longitudinal speed, u2 is vehicle lateral acceleration, u3 is steering wheel angle, u4 is vehicle yaw rate, u5 is (engine) driving torque at the driving wheels, whereby K0n and K1n are constants, and whereby are the first time derivates of the variables u.

The output DEST provided by the second processor 13 is calculated by said second processor 13 in real time.

The output DEST can be calculated using a physically based model for a fully experimental model using whatever vehicle dynamics data is available.

According to FIG. 1, the difference between the controller output COUT and the output DEST provided by second processor 13 is used as input for power steering system 10 influencing said steering feedback torque.

Preferably, the power steering system 10 is designed as an electrical power steering system. However, it is also possible to make use of a hydraulic power steering system or a power steering system with equivalent functionality.

It is possible to measure both the steering feedback torque that the driver experiences and the power assist torque the power steering system applies. The steering feedback torque that the driver experiences can be measured by sensors of the power steering system. The power assist torque applied by an electrical power steering system can be measured by measurements of the electrical current through a power assist motor of said electrical power steering system. Further on, it is possible to calculate the ideal/nominal steering feedback torque on real time basis. This calculated nominal steering feedback torque is compared to the actual steering feedback torque and a closed control loop eliminates the difference. A feed forward type of control can be used to compensate for predictable disturbances on real time basis in order to improve the response of the control system.

The invention provides also a computer program for executing the above described method according to the present, an electronically controlled power steering system comprising electronically controlled processor executing the above described method according to the present, a data medium holding a computer program for executing the above described method according to the present invention and a car comprising an electronically controlled power steering system having electronically controlled processor executing the above described method according to the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling a steering feedback torque of a power steering system within a closed loop control system, whereby the power steering system provides an actual value (TACT) of the steering feedback torque, comprising the steps of:

calculating a nominal value ($T_{NOM}$) of the steering feedback torque using vehicle dynamic related data, wherein said nominal value ($T_{NOM}$) of the steering feedback torque is calculated by a first processor using at least one of a measurement or an estimate of a vehicle speed;

calculating a difference between said actual value (TACT) of the steering feedback torque and said nominal value ($T_{NOM}$) of the steering feedback torque;

providing the difference as an input for a controller that provides an controller output (COUT); and providing an input for the power steering system on a basis of said controller output (COUT) influencing said steering feedback torque in a way that the difference between said actual value (TACT) of the steering feedback torque and said nominal value ($T_{NOM}$) of the steering feedback torque is at least reduced.

2. The method according to claim 1, wherein said nominal value ($T_{NOM}$) of the steering feedback torque is calculated with a first processor using at least one of a measurement or an estimate of a steering angle.

3. The method according to claim 2, wherein said at least one of the measurement or the estimate of the steering angle are provided by the power steering system.

4. The method according to claim 1, wherein said at least one of the measurement or the estimate of the vehicle speed is provided by a stability control system of a vehicle.

5. The method according to claim 1, wherein said nominal value ($T_{NOM}$) of the steering feedback torque is calculated in real time.

6. The method according to claim 1, wherein said input for the power steering system influencing said steering feedback torque is provided on the basis of said controller output (COUT) and on the basis of an output (DEST) provided by a second processor using vehicle dynamic related measurements or estimates, whereby said output (DEST) provided by said second processor influences said steering feedback torque in a way that predictable disturbances of the steering feedback torque are compensated.

7. A computer readable medium embodying a computer program product, said program product comprising:
a program for controlling a steering feedback torque of a power steering system within a closed loop control system, whereby the power steering system provides an actual value (TACT) of the steering feedback torque, the program configured for:
calculating a nominal value ($T_{NOM}$) of the steering feedback torque using vehicle dynamic related data;
calculating a difference between said actual value (TACT) of the steering feedback torque and said nominal value ($T_{NOM}$) of the steering feedback torque;
providing the difference as an input for a controller that provides an controller output (COUT); and
providing an input for the power steering system on a basis of said controller output (COUT) and on the basis of an output (DEST) provided by a second processor using vehicle dynamic related measurements or estimates, whereby said controller output (COUT) influences said steering feedback torque in a way that the difference between said actual value (TACT) of the steering feedback torque and said nominal value ($T_{NOM}$) of the steering feedback torque is at least reduced, and whereby said output (DEST) provided by said second processor influences said steering feedback torque in a way that predictable disturbances of the steering feedback torque are compensated.

8. The computer readable medium embodying a computer program product according to claim 7, wherein said nominal value ($T_{NOM}$) of the steering feedback torque is calculated with a first processor using at least one of a measurement or an estimate of a steering angle.

9. The computer readable medium embodying a computer program product according to claim 8, wherein said at least one of the measurement or the estimate of the steering angle are provided by the power steering system.

10. The computer readable medium embodying a computer program product according to claim 7, wherein said nominal value ($T_{NOM}$) of the steering feedback torque is calculated by a first processor using at least one of a measurement or an estimate of a vehicle speed.

11. The computer readable medium embodying a computer program product according to claim 10, wherein said at least one of the measurement or the estimate of the vehicle speed is provided by a stability control system of a vehicle.

12. The computer readable medium embodying a computer program product according to claim 7, wherein said nominal value ($T_{NOM}$) of the steering feedback torque is calculated in real time.

13. A method for controlling a steering feedback torque of a power steering system within a closed loop control system, whereby the power steering system provides an actual value (TACT) of the steering feedback torque, comprising the steps of:
calculating a nominal value ($T_{NOM}$) of the steering feedback torque using vehicle dynamic related data;
calculating a difference between said actual value (TACT) of the steering feedback torque and said nominal value ($T_{NOM}$) of the steering feedback torque;
providing the difference as an input for a controller that provides an controller output (COUT); and
providing an input for the power steering system on a basis of said controller output (COUT) and on the basis of an output (DEST) provided by a second processor using vehicle dynamic related measurements or estimates, whereby said controller output (COUT) influences said steering feedback torque in a way that the difference between said actual value (TACT) of the steering feedback torque and said nominal value ($T_{NOM}$) of the steering feedback torque is at least reduced, and whereby said output (DEST) provided by said second processor influences said steering feedback torque in a way that predictable disturbances of the steering feedback torque are compensated.

14. The method according to claim 13, wherein said output (DEST) provided by the second processor is calculated by said second processor using at least one of a measurement or estimate of a steering angle.

15. The method according to claim 14, wherein at least one of the measurement or the estimate of the steering angle is provided by said power steering system.

16. The method according to claim 13, wherein said output (DEST) provided by said second processor is calculated by said second processor using at least one of a measurement or an estimate of a powertrain torque.

17. The method according to claim 16, wherein said at least one of the measurement or the estimate provided of the powertrain torque is provided by a stability control system of the vehicle.

18. The method according to claim 13, wherein said output (DEST) provided by the second processor is calculated in real time.

* * * * *